United States Patent
Yamamoto et al.

(10) Patent No.: US 10,975,949 B2
(45) Date of Patent: Apr. 13, 2021

(54) STRADDLE VEHICLE

(71) Applicant: KAWASAKI JUKOGYO KABUSHIKI KAISHA, Kobe (JP)

(72) Inventors: Tetsuji Yamamoto, Akashi (JP); Yoshihiko Inagaki, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 233 days.

(21) Appl. No.: 16/048,837

(22) Filed: Jul. 30, 2018

(65) Prior Publication Data

US 2019/0078678 A1    Mar. 14, 2019

(30) Foreign Application Priority Data

Sep. 13, 2017    (JP) .................................. 2017-175964

(51) Int. Cl.
*F16H 57/00*    (2012.01)
*B62M 25/00*    (2006.01)
(Continued)

(52) U.S. Cl.
CPC ............... *F16H 57/00* (2013.01); *B62H 1/00* (2013.01); *B62J 99/00* (2013.01); *B62M 25/00* (2013.01); *B62M 25/06* (2013.01); *F16H 63/08* (2013.01); *F16H 63/18* (2013.01); *B62J 45/40* (2020.02); *F16H 59/70* (2013.01); *F16H 2057/0056* (2013.01); *F16H 2057/02065* (2013.01)

(58) Field of Classification Search
CPC ............. F16H 57/00; F16H 2057/0056; F16H 2057/02065; B62M 25/00; B62M 2025/003; B62M 25/06
See application file for complete search history.

(56) References Cited

U.S. PATENT DOCUMENTS 7,357,114 B2 *   4/2008   Taki ......................... B62J 13/00
                                                    123/198 D
7,770,481 B2 *   8/2010   Takemoto ............... F16H 63/18
                                                    74/337.5
(Continued)

FOREIGN PATENT DOCUMENTS

JP          2004138102 A       5/2004
JP          2012197853 A      10/2012
JP          2017096859 A       6/2017

*Primary Examiner* — Kevin Hurley
*Assistant Examiner* — Michael R Stabley
(74) *Attorney, Agent, or Firm* — Alleman Hall Creasman & Tuttle LLP (57) ABSTRACT

A straddle vehicle comprises a shift drum formed with an engaged part; a transmission case formed with an insertion hole, a gear position sensor including an engagement part engageable with the engaged part; and a seal ring fitted to the outer peripheral surface of the gear position sensor, and the insertion hole includes a first inner peripheral surface with which the seal ring is in tight contact in a state in which the engagement part is engaged with the engaged part, and a second inner peripheral surface located closer to an entrance of the insertion hole than the first inner peripheral surface and having a diameter larger than a diameter of the first inner peripheral surface, and in a state in which the seal ring has reached an entrance of the first inner peripheral surface, at least a portion of the engagement part is fitted to the engaged part.

8 Claims, 5 Drawing Sheets

(51) Int. Cl.
    *B62M 25/06*     (2006.01)
    *B62H 1/00*     (2006.01)
    *F16H 63/08*     (2006.01)
    *F16H 63/18*     (2006.01)
    *B62J 99/00*     (2020.01)
    *F16H 59/70*     (2006.01)
    *F16H 57/02*     (2012.01)
    *B62J 45/40*     (2020.01)

(56) References Cited

U.S. PATENT DOCUMENTS

| | | | |
|---|---|---|---|
| 8,844,394 B2* | 9/2014 | Tokito | F16H 59/70 |
| | | | 74/337.5 |
| 8,864,591 B2* | 10/2014 | Sugiyama | F16C 1/04 |
| | | | 464/173 |
| 9,228,638 B2* | 1/2016 | Matsumoto | F16H 3/08 |
| 9,664,255 B2* | 5/2017 | Sugano | F16H 3/02 |
| 9,683,724 B2* | 6/2017 | Takenaka | F21S 45/47 |
| 2012/0240702 A1 | 9/2012 | Tokito | |
| 2017/0152945 A1 | 6/2017 | Ishiyama | |
| 2017/0343383 A1* | 11/2017 | Kishi | G01D 11/245 |

\* cited by examiner

Fig. 5

STRADDLE VEHICLE

CROSS-REFERENCE TO THE RELATED APPLICATION

This application claims priority to and the benefit of Japanese Patent Application No. 2017-175964 filed on Sep. 13, 2017, the entire disclosure of which is incorporated herein by reference.

BACKGROUND OF THE INVENTION

Field of the Invention

The present invention relates to a straddle vehicle including a gear position sensor which detects a rotation angle of a shift drum.

Description of Related Art

Japanese Laid-Open Patent Application Publication No. 2012-197853 discloses that an engagement groove is formed in an axial end surface of a shift drum which changes a transmission gear position of a transmission, an engagement pin of the gear position sensor inserted into an insertion hole of a crankcase (transmission case) is engaged with the engagement groove, and thus a rotation angle of the shift drum is detected.

In a case where an operator performs work for inserting a gear position sensor into an insertion hole of a crankcase during assembly of a vehicle, it is necessary to push the gear position sensor into the insertion hole over a long axial distance, in a state in which a seal ring fitted to the outer peripheral surface of the gear position sensor is pressed against the inner peripheral surface of the insertion hole and deformed. For this reason, the operator inserts the gear position sensor into the insertion hole while moving the gear position sensor in clockwise and counterclockwise directions (twisting the gear position sensor) around an axis line thereof, to reduce an insertion resistance applied to the seal ring. However, in the work for inserting the gear position sensor into the insertion hole in this way, the engagement pin is deviated from the engagement groove around the axis line at a time point when the engagement pin reaches the shift drum. As a result, the gear position sensor cannot be smoothly mounted on the crankcase.

SUMMARY OF THE INVENTION

The present invention addresses the above-described conditions, and an object of the present invention is to make it possible to easily perform work for inserting a gear position sensor into an insertion hole of a case, and to prevent occurrence of a position deviation between the gear position sensor and a shift drum around an axis line, in a configuration for sealing a space between the outer peripheral surface of the gear position sensor and the inner peripheral surface of the insertion hole with a seal ring.

According to an aspect of the present invention, a straddle vehicle comprises a shift drum which changes a gear position of a transmission including a plurality of gear trains and is formed with an engaged part in an end surface thereof; a transmission case which accommodates the shift drum therein, and is formed with a circular insertion hole coaxial with the shift drum, the end surface of the shift drum being accommodated in the insertion hole; a gear position sensor having a circular outer peripheral surface and including an engagement part engageable with the engaged part of the shift drum in a state in which the gear position sensor is inserted into the insertion hole, the gear position sensor being configured to detect a rotation angle of the shift drum; and a seal ring fitted to the outer peripheral surface of the gear position sensor, wherein the insertion hole includes a first inner peripheral surface with which the seal ring is in tight contact in a state in which the engagement part is engaged with the engaged part of the shift drum, and a second inner peripheral surface located closer to an entrance of the insertion hole than the first inner peripheral surface and having a diameter larger than a diameter of the first inner peripheral surface, and wherein in a state in which the seal ring has passed through the second inner peripheral surface and has reached an entrance of the first inner peripheral surface, at least a portion of the engagement part of the gear position sensor is fitted to the engaged part of the shift drum.

In accordance with this configuration, in work for inserting the gear position sensor into the insertion hole, an insertion resistance generated while the seal ring is passing through the second inner peripheral surface with a diameter larger than that of the first inner peripheral surface is less than that generated while the seal ring is passing through the first inner peripheral surface. Therefore, an operator can easily perform the work for inserting the gear position sensor into the insertion hole while keeping a state in which the angle of the engagement part and the angle of the engaged part conform to each other. From a time point when the seal ring has reached the entrance of the first inner peripheral surface, a high insertion resistance is generated. Therefore, even when the operator continues to insert the gear position sensor into the insertion hole while slightly moving the gear position sensor in clockwise and counterclockwise directions around the axis line, a position deviation between the engagement part and the engaged part around the axis line can be prevented, because at least a portion of the engagement part is fitted to the engaged part. Therefore, in a configuration for sealing a space between the outer peripheral surface of the gear position sensor and the inner peripheral surface of the insertion hole of the transmission case, with the seal ring, the work for inserting the gear position sensor into the insertion hole can be easily performed, and a position deviation between the gear position sensor and the shift drum around the axis line can be prevented.

The insertion hole may further include a third inner peripheral surface formed between the first inner peripheral surface and the second inner peripheral surface and facing the entrance of the insertion hole, and the third inner peripheral surface may be provided at a location where at least a portion of the engagement part is fitted to an entrance portion of the engaged part in a state in which the seal ring is in contact with the third inner peripheral surface.

In accordance with this configuration, from a time point when the seal ring has reached the third inner peripheral surface, a relatively high insertion resistance begins to be transmitted to the operator. From this, the operator can be aware that the operator may further insert the gear position sensor into the insertion hole while moving the gear position sensor in clockwise and counterclockwise directions around the axis line (e.g., while twisting the gear position sensor).

The third inner peripheral surface may be an inclined surface with a diameter reduced in a direction from the second inner peripheral surface toward the first inner peripheral surface.

In accordance with this configuration, in the work for inserting the gear position sensor into the insertion hole, the seal ring which has reached the third inner peripheral surface is gradually pressed in a radial direction. Therefore, the work for inserting the gear position sensor into the insertion hole can be easily performed.

The second inner peripheral surface may have an inner diameter which is equal to or larger than an outer diameter of the seal ring.

In accordance with this configuration, the work for inserting the gear position sensor into the insertion hole can be easily performed.

A clearance in a circumferential direction around an axis line which is formed between the engagement part of the gear position sensor and the engaged part of the shift drum may be increased as the gear position sensor approaches the entrance of the insertion hole.

In accordance with this configuration, since the clearance in the circumferential direction is formed between the engagement part and the engaged part in a region that is in the vicinity of the entrance of the insertion hole, the gear position sensor can be moved in clockwise and counterclockwise directions around the axis line. In addition, since the clearance in the circumferential direction between the engagement part and the engaged part in a region that is distant from the entrance is reduced, an allowance in the circumferential direction between the engagement part and the engaged part is reduced, and it becomes possible to easily keep a state in which the angle of the engagement part and the angle of the engaged part conform to each other.

The straddle vehicle may further comprise a vehicle body frame supporting the transmission case; and a side stand provided so that the vehicle body frame is tilted to a first side in a vehicle width direction during use of the side stand, the shift drum may extend in the vehicle width direction, and the insertion hole may open outward of the transmission case, on the first side in the vehicle with direction.

In accordance with this configuration, even in a case where rain water or the like is accumulated in a portion of a clearance formed between the outer peripheral surface of the gear position sensor and the second inner peripheral surface of the insertion hole of the transmission case, the portion being located outward in the vehicle width direction relative to the seal ring, the rain water or the like can be naturally discharged by tilting the vehicle body by use of the side stand.

The above and further objects, features and advantages of the present invention will more fully be apparent from the following detailed description of a preferred embodiment with reference to the accompanying drawings.

DETAILED DESCRIPTION OF THE PREFERRED EMBODIMENTS

Hereinafter, the embodiment of the present invention will be described with reference to the drawings. The stated directions are from the perspective of a rider R straddling the motorcycle.

Figure 1:
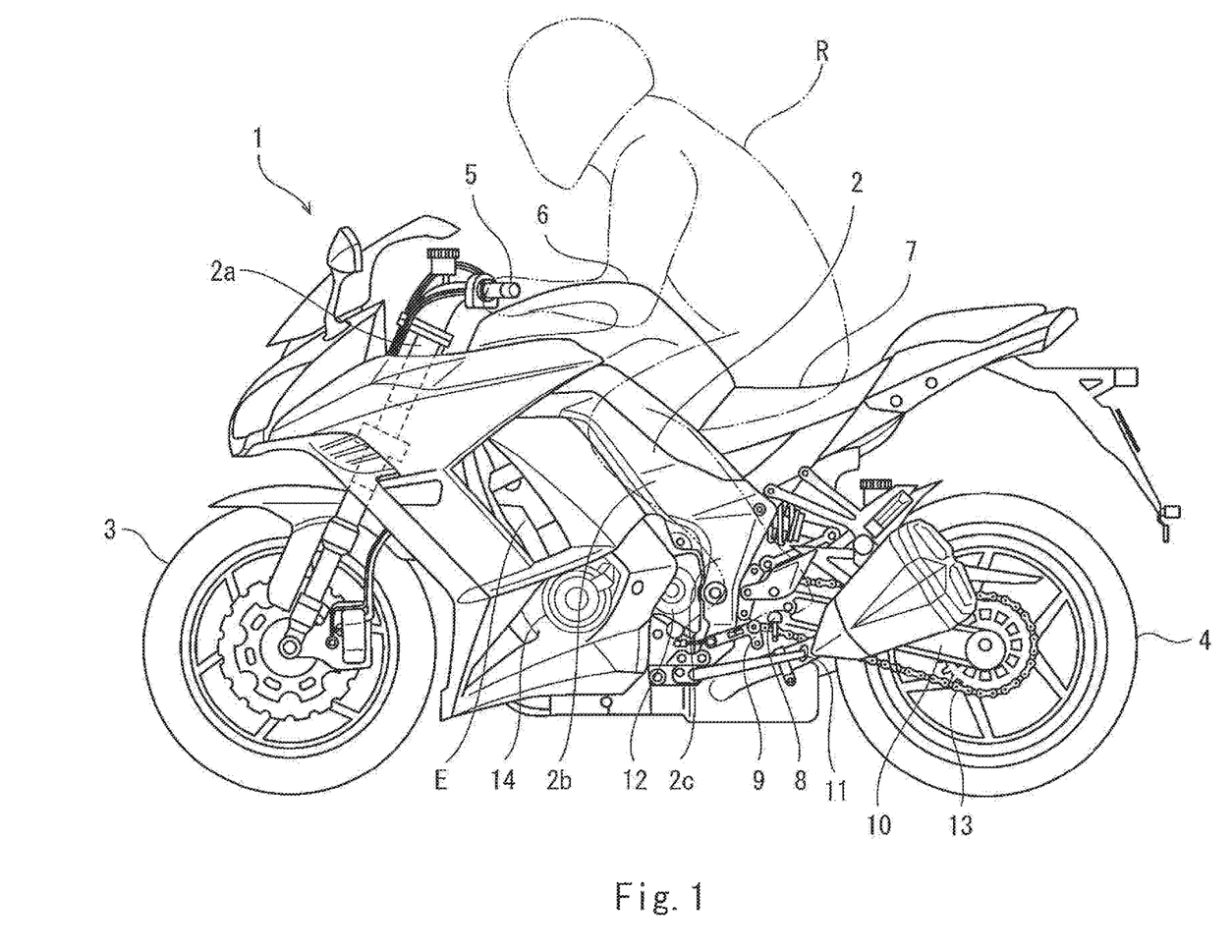
FIG. 1 is a left side view of a motorcycle according to an embodiment.

FIG. 1 is a left side view of a motorcycle according to an embodiment. As shown in FIG. 1, a motorcycle 1 which is an example of a straddle vehicle includes a vehicle body frame 2, a front wheel 3 mounted on the vehicle body frame 2, and a rear wheel 4 mounted on the vehicle body frame 2. The front wheel 3 is a driven wheel, and the rear wheel 4 is a drive wheel. The vehicle body frame 2 includes a head pipe 2a, a main frame 2b extending rearward from the head pipe 2a, and a pivot frame 2c connected to the rear portion of the main frame 2b. A steering shaft (not shown) is coupled to a bar-type handle 5 which can be gripped by a rider R. The head pipe 2a supports the steering shaft in such a manner that the steering shaft is rotatable. The steering shaft is rotated, and thus the front wheel 3 is steered to the right or the left.

A fuel tank 6 is disposed at a location that is rearward of the handle 5 and on an upper side of the main frame 2. A seat 7 is disposed rearward of the fuel tank 6. The rider R straddles the seat 7. Step members 8 are disposed below the seat 7 and on right and left sides. The feet of the rider R rest on the step members 8, respectively. A shift lever 9 is disposed in the vicinity of the step member 8 and operated by the rider's foot resting on the step member 8. The front end portion of a swing arm 10 is mounted on the pivot frame 2c in such a manner that the swing arm 10 is pivotable. The rear wheel 4 is rotatably mounted on the rear end portion of the swing arm 10. A side stand 11 is provided on a first side (left side in the present embodiment) of the pivot frame 2c in a vehicle width direction and used to park the motorcycle 1. During use of the side stand 11, the motorcycle 1 is tilted to the first side (left side in the present embodiment) in the vehicle width direction.

Between the front wheel 3 and the rear wheel 4, an engine E is mounted on the main frame 2b and the pivot frame 2c. A transmission 12 is connected to the output shaft of the engine E so that driving power generated in the engine E can be transmitted to the transmission 12. The driving power is output from the transmission 12 and transmitted to the rear wheel 4 via a driving power transmission member 13 (e.g., an endless annular driving power transmission member such as a chain or a belt). A crankshaft Ea of the engine E is accommodated in a crankcase 14 supportedly mounted on the vehicle body frame 2. The transmission 12 is also accommodated in the crankcase 14. In this way, the crankcase 14 also functions as a transmission case.

Figure 2:
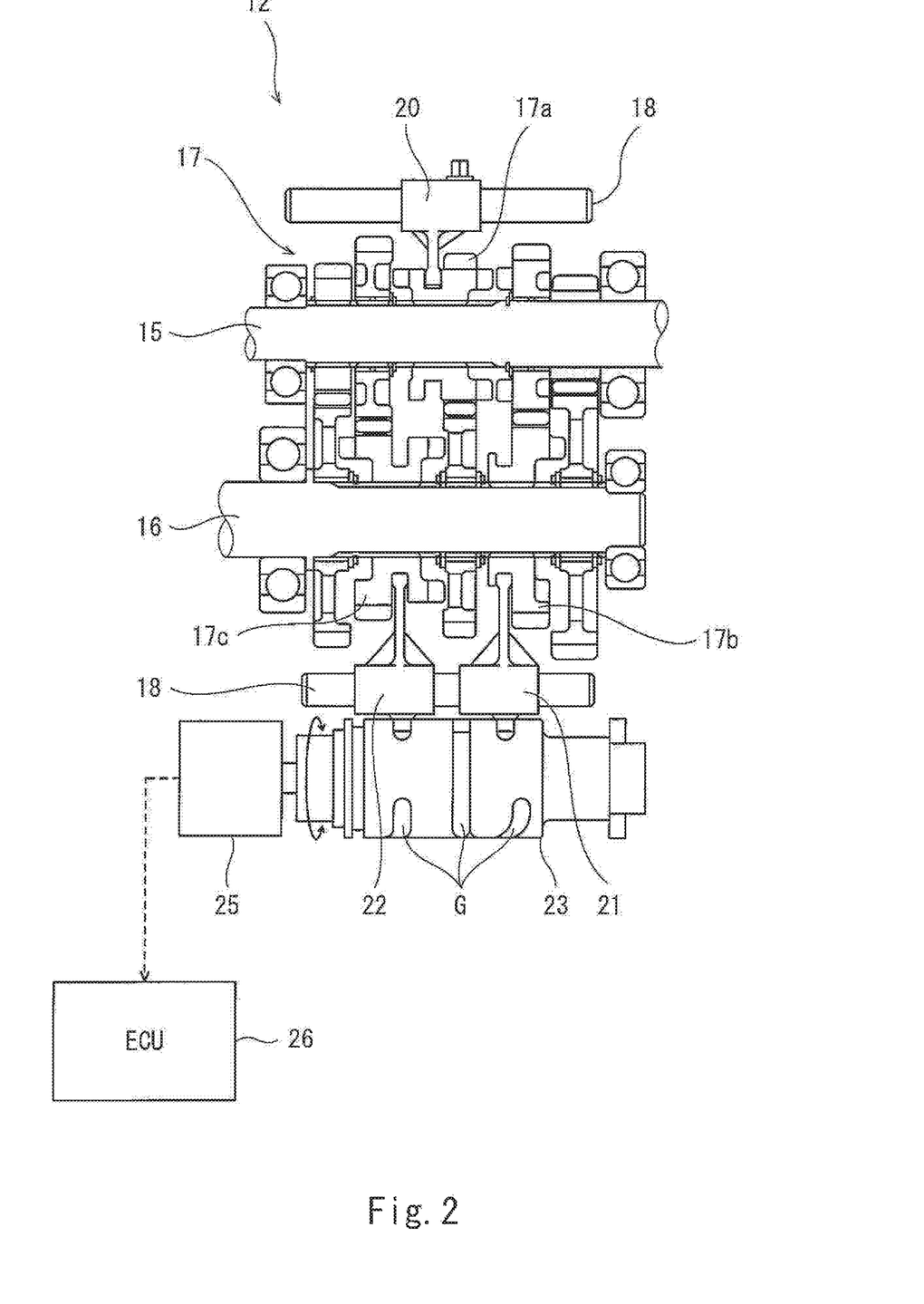
FIG. 2 is a cross-sectional view of a transmission of the motorcycle of FIG. 1, which is sectioned along a plane passing through shafts.

FIG. 2 is a cross-sectional view of the transmission 12 of the motorcycle 1 of FIG. 1, which is sectioned along a plane passing through shafts. Referring to FIG. 2, the transmission 12 is capable of transmitting the driving power from an input shaft 15 to an output shaft 16 via selected one of plural sets of gear trains 17 with different reduction gear ratios. The transmission 12 is a dog gear transmission configured to change the driving power via the selected one of plural sets of gear trains 17. The driving power is transmitted from a crankshaft (not shown) of the engine E (see FIG. 1) to the input shaft 15 of the transmission 12. A driving power output mechanism such as a chain sprocket mechanism (not shown) is provided at a first end portion (e.g., left end portion) of the output shaft 16 in the vehicle width direction. The driving power transmission member 13 (see FIG. 1) connected to the rear wheel 4 is engageable with this driving power output mechanism.

In the transmission 12, shift forks 20 to 22 are slidably supported by support shafts 18 disposed in parallel with the input shaft 15 and the output shaft 16. The first end portion of the shift fork 20 is connected to a dog gear 17a of the input shaft 15. The first end portions of the shift forks 21, 22 are connected to dog gears 17b, 17c, respectively, of the output shaft 16. The second end portions of the shift forks 20 to 22 are fitted to guide grooves respectively, of a shift drum 23. The shift drum 23 mechanically responds to the rider R's operation of the shift lever 9 (see FIG. 1) and rotates. Thereby, the shift forks 20 to 23 are guided to the corresponding guide grooves and slide corresponding dog gears 17a to 17c along the output shaft 16. In this state, the gear train 17 corresponding to a reduction gear ratio set desired by the rider R is placed in a driving power transmission state. In this way, a driving power transmission path of a desired transmission gear position is selected.

The crankshaft Ea, the input shaft 15, the output shaft 16, and the shift drum 23 are accommodated in the crankcase 14 in a state in which the crankshaft Ea, the input shaft 15, the output shaft 16, and the shift drum 23 extend in the vehicle width direction. A gear position sensor 25 which detects a rotation angle of the shift drum 23 is engaged with the shift drum 23 of the transmission 12. The gear position sensor 25 is connected to a controller 26 (ECU) which controls the engine E.

Figure 3:
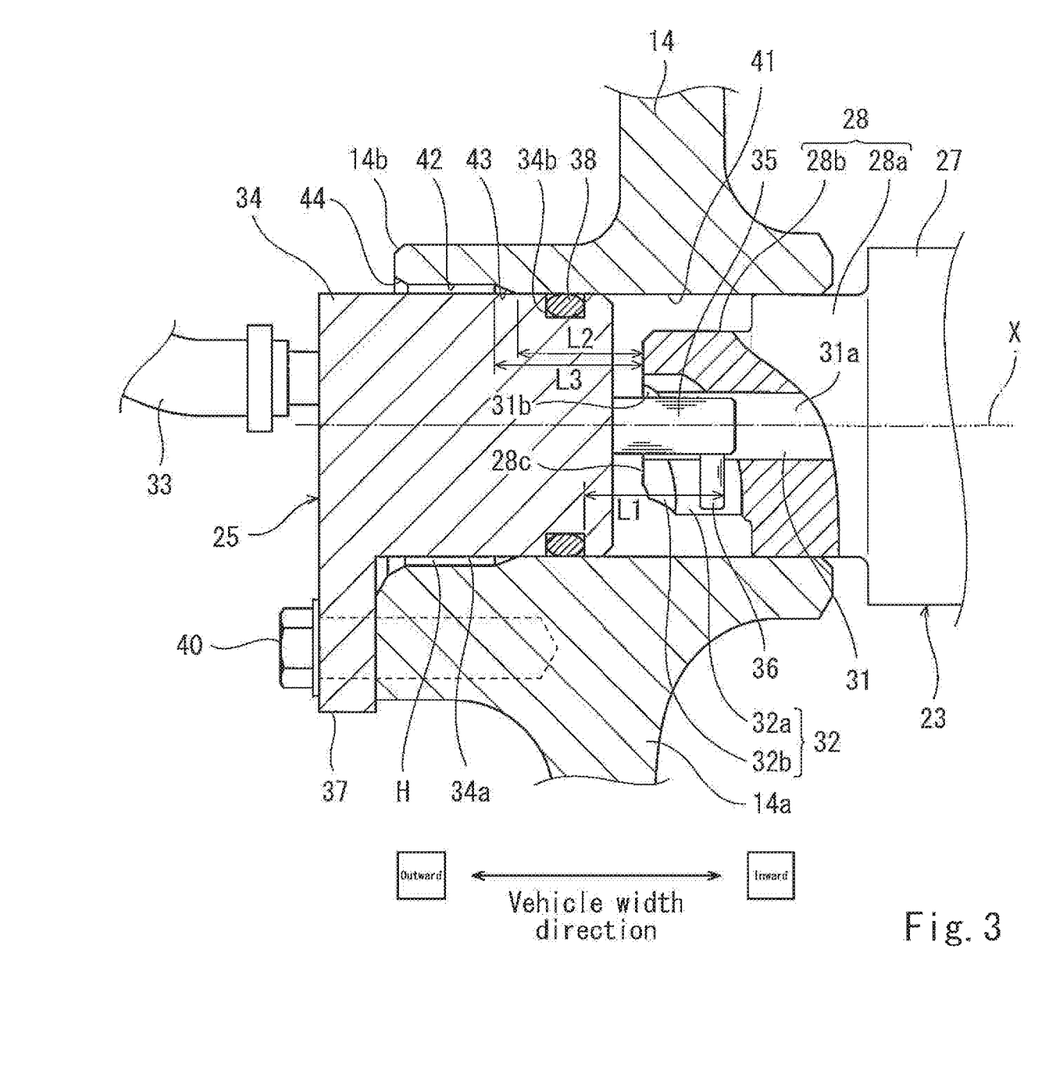
FIG. 3 is a cross-sectional view of major constituents, for explaining an engagement state between a shift drum and a gear position sensor of FIG. 2.
Figure 4:
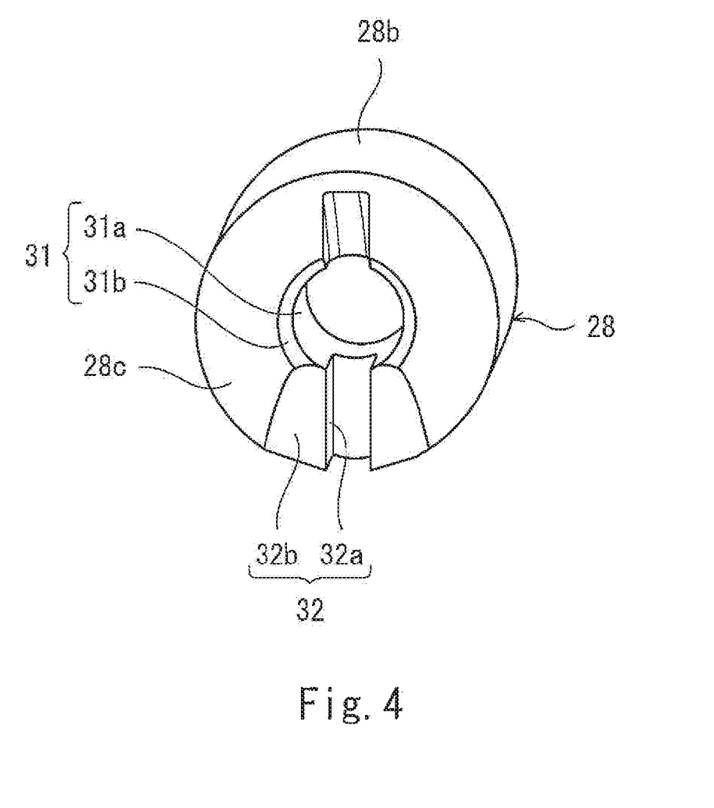
FIG. 4 is a perspective view showing an engaged part of the shift drum of FIG. 3.

FIG. 3 is a cross-sectional view of major constituents, for explaining an engagement state between the shift drum 23 and the gear position sensor 25 of FIG. 2. FIG. 4 is a perspective view showing an engaged groove 32 of the shift drum 23 of FIG. 3. As shown in FIG. 3, a boss 14b protruding in the vehicle width direction is provided at a side wall 14a on the first side (left side) in the vehicle width direction, of the crankcase 14. The boss 14b is formed with an insertion hole H with an axis line X extending in the vehicle width direction. Specifically, the insertion hole H opens outward of the crankcase 14 on the first side (left side) in the vehicle width direction. In addition, the insertion hole H opens in the interior of the crankcase 14. Alternatively, the insertion hole H for the gear position sensor 25 may be provided in a crankcase cover covering the crankcase 14 from an outer side in the vehicle width direction.

The axis of the shift drum 23 is coaxial with the axis line X of the insertion hole H. The shift drum 23 includes a drum body 27 formed with the guide grooves G (see FIG. 3), and a drum end portion 28 which protrudes from an end surface on the first side in the vehicle width direction, of the drum body 27, and is inserted into the insertion hole H. Specifically, an end surface 28c facing the first side (left side) in the vehicle width direction, of the drum end portion 28, is accommodated in the insertion hole H. In the present embodiment, the drum end portion 28 includes a fitted portion 28a which protrudes from the drum body 27 to the first side in the vehicle width direction and is rotatably fitted into the insertion hole H of the crankcase 14, and a protruding portion 28b which protrudes from the fitted portion 28a to the first side in the vehicle width direction and has a diameter smaller than that of the fitted portion 28a.

Figure 5:
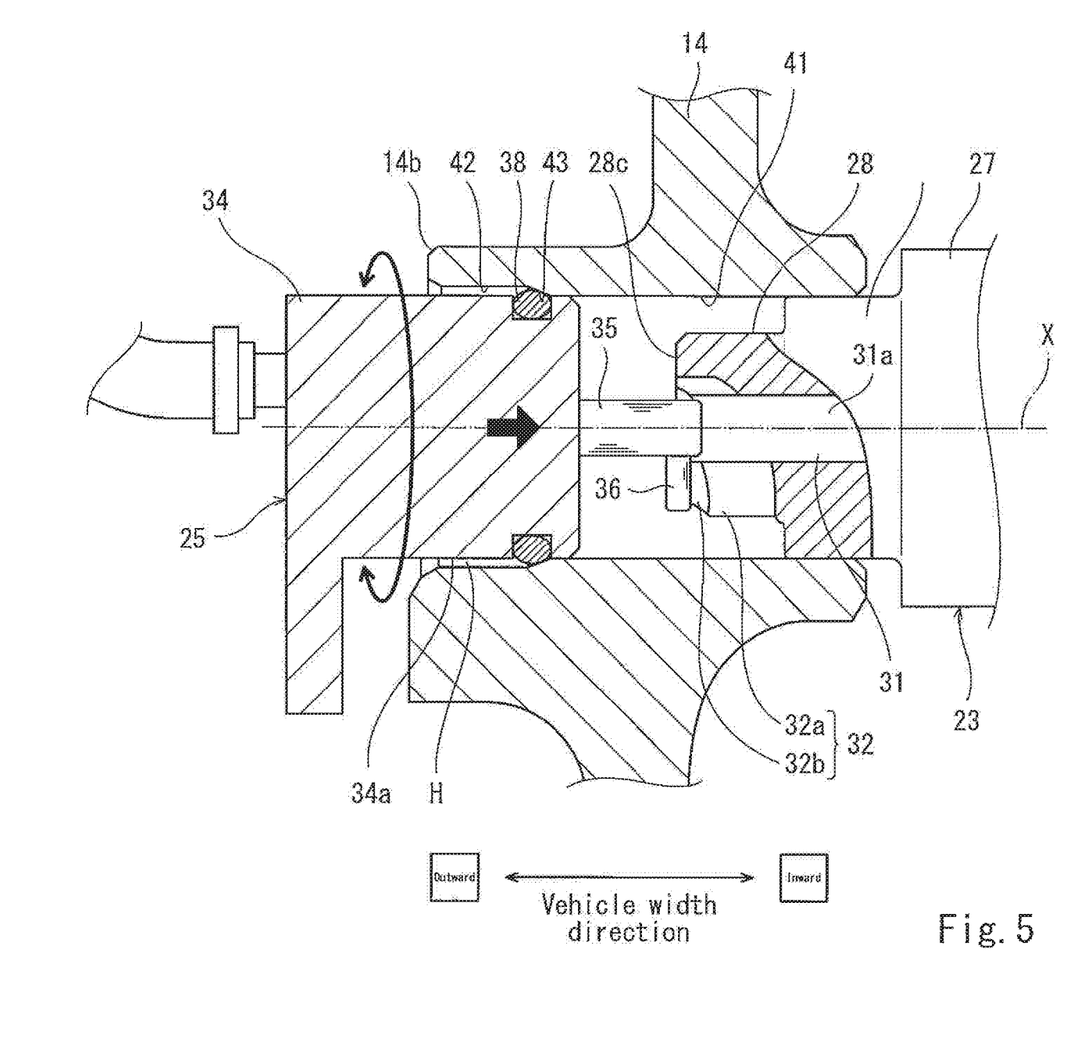
FIG. 5 is a cross-sectional view of major constituents, for explaining work for mounting the gear position sensor of FIG. 3 on a crankcase.

As shown in FIGS. 3 and 5, the end surface 28c of the drum end portion 28 is formed with the engaged groove 32 (engaged part) with which the gear position sensor 25 is engageable. The engaged groove 32 has a recessed (depressed) shape or a groove shape which opens toward the gear position sensor 25. Specifically, a center hole 31 extending on the axis line X is formed in a center portion of the end surface 28c of the drum end portion 28. The engaged groove 32 extends in a direction perpendicular to the axis line X, from the center hole 31. The center hole 31 includes a constant-diameter portion 31a having a constant diameter and extending in the vehicle width direction, and an entrance portion 31b with a diameter gradually increased from the constant-diameter portion 31a toward the end surface 28c.

The engaged groove 32 includes a constant-width portion 32a with a constant width in a circumferential direction around the axis line X, and an entrance portion 32b with a width gradually increased from the constant-width portion 32a toward the end surface 28c. The increased-width region (entrance portion 32b) of the engaged groove 32 is longer in the axis line X direction than the increased-diameter portion (entrance portion 31b) of the center hole 31. The width in the circumferential direction around the axis line X, of the entrance portion 32b of the engaged groove 32 is gradually increased in a radially outward direction of the drum end portion 28. Although in the example of FIG. 4, a groove extending from the center hole 31 on a side opposite to the engaged groove 32 is formed, this groove may be omitted. Although in the example of FIG. 4, the engaged groove 32 opens in the radially outward direction of the drum end portion 28, it may not open in the radially outward direction of the drum end portion 28.

Referring to FIG. 3, the gear position sensor 25 is a sensor which detects a present (current) transmission gear position of the transmission 12 in such a manner that the gear position sensor 25 detects the rotation angle of the shift drum 23 to detect at which angle the shift drum 23 is present. The gear position sensor 25 includes a sensor body 34 which has a circular outer peripheral surface 34a and to which a signal cable 33 is connected, a sensor shaft 35 protruding from the tip end surface of the sensor body 34 toward the drum end portion 28 and extending on the axis line X, an engagement pin 36 (engagement part) protruding in a direction perpendicular to the axis line X from the sensor shaft 35, and a sensor fastening part 37 protruding in the direction perpendicular to the axis line X, from a portion of the sensor body 34, the portion being on a side opposite to the sensor shaft 35. The outer peripheral surface 34a of the sensor body 34 is formed with an annular groove 34b extending around the axis line X. A seal ring 38 is fitted to the annular groove 34b. The cross-sectional shape of the seal ring 38, which is perpendicular to the extension direction of the seal ring 38, is, for example, a circle. The seal ring 38 in a non-compressed state has a diameter larger than that of the outer peripheral surface 34a of the sensor body 34.

The sensor fastening part 37 is fastened to the outer surface of the side wall 14a of the crankcase 14 by use of a fastening member 40 (e.g., bolt), in a state in which the sensor body 34 is inserted into the insertion hole H. In a state in which the sensor body 34 is inserted into the insertion hole H and the sensor fastening part 37 is fastened to the crankcase 14, the engagement pin 36 of the gear position sensor 25 is engaged with the engaged groove 32 of the shift drum 23. This allows the gear position sensor 25 to rotate around the axis line X together with the shift drum 23 in a state in which the gear position sensor 25 is placed coaxially with the shift drum 23.

The sensor shaft 35 of the gear position sensor 25 is inserted into the center hole 31 of the drum end portion 28 of the shift drum 23. The engagement pin 36 of the gear position sensor 25 is inserted into the engaged groove 32 of the drum end portion 28 of the shift drum 23. Thus, the engagement pin 36 is positioned in the circumferential direction around the axis line X with respect to the shift drum 23.

The insertion hole H of the crankcase 14 includes a first inner peripheral surface 41, a second inner peripheral surface 42, a third inner peripheral surface 43, and a fourth inner peripheral surface 44. In the present embodiment, the first inner peripheral surface 41, the third inner peripheral surface 43, the second inner peripheral surface 42, and the fourth inner peripheral surface 44 are arranged continuously in this order from an inner side in the vehicle width direction to an outer side in the vehicle width direction (from a right side to a left side in FIG. 3). The drum end portion 28 of the shift drum 23 is inserted into the insertion hole H from the inside of the crankcase 14, and supported by the first inner peripheral surface 41. The sensor body 34 of the gear position sensor 25 is fitted to the first inner peripheral surface 41, from the outer side in the vehicle width direction. The seal ring 38 is in tight contact with (is pressed against) the first inner peripheral surface 41, in a state in which the engagement pin 36 of the gear position sensor 25 is entirely engaged with the engaged groove 32 of the shift drum 23. The first inner peripheral surface 41 has a constant inner diameter.

The second inner peripheral surface 42 is located closer to the entrance of the insertion hole H than the first inner peripheral surface 41 (located outward of the first inner peripheral surface 41 in the vehicle width direction). The second inner peripheral surface 42 has a diameter large than that of first inner peripheral surface 41. The second inner peripheral surface 42 has an inner diameter that is equal to or larger than the outer diameter of the seal ring 38. The second inner peripheral surface 42 has a constant diameter. The length in the axis line X direction, of the second inner peripheral surface 42 is shorter than that of the first inner peripheral surface 41, and longer than that of the third inner peripheral surface 43 which will be described later.

The third inner peripheral surface 43 is provided between the first inner peripheral surface 41 and the second inner peripheral surface 42. The third inner peripheral surface 43 faces the entrance of the insertion hole H (outward side in the vehicle width direction). Specifically, the third inner peripheral surface 43 is an inclined surface with a diameter reduced in a direction from the second inner peripheral surface 42 toward the first inner peripheral surface 41. Although this inclined surface is inclined linearly (in a straight line shape), it may be inclined in a curved line shape. The length in the axis line X direction, of the third inner peripheral surface 43, is shorter than those of the first inner peripheral surface 41 and the second inner peripheral surface 42. For example, the length in the axis line X direction, of the third inner peripheral surface 43 may be 0.3 to 1.5 times, preferably, 0.4 to 0.9 times of the thickness in the axis line X direction, of the seal ring 38.

The fourth inner peripheral surface 44 is located outward of the second inner peripheral surface 42 in the vehicle width direction and is adjacent to the second inner peripheral surface 42. The fourth inner peripheral surface 44 is continuous with the outer surface of the side wall 14a of the crankcase 14. The fourth inner peripheral surface 44 is an inclined surface with a diameter reduced in a direction from the second inner peripheral surface 42 toward the outer surface of the side wall 14a.

A distance L1 from the end edge of the seal ring 38 on the inner side in the vehicle width direction, to the end edge of the engagement pin 36 on the inner side in the vehicle width direction, is longer than a distance L2 from the end surface 28c of the shift drum 23 on the outer side in the vehicle width direction to the end edge of the first inner peripheral surface 41 on the outer side in the vehicle width direction. The distance L1 is shorter than a distance L3 from the end surface 28c of the shift drum 23 on the outer side in the vehicle width direction to the end edge of the second inner peripheral surface 42 on the inner side in the vehicle width direction.

FIG. 5 is a cross-sectional view of major constituents, for explaining work for mounting the gear position sensor 25 of FIG. 3 on the crankcase 14. Referring to FIG. 5, the gear position sensor 25 is mounted on the crankcase 14, after the transmission 12 (see FIG. 2) is accommodated into the crankcase 14. In other words, before the gear position sensor 25 is mounted on the crankcase 14, the shift drum 23 has already been mounted on the crankcase 14.

An operator inserts the sensor body 34 of the gear position sensor 25 into the insertion hole H of the crankcase 14, from an outer side in the vehicle width direction. At an initial stage of work for inserting the gear position sensor 25 into the insertion hole H of the crankcase 14, the seal ring 38 of the gear position sensor 25 passes through the second inner peripheral surface 42.

Since the diameter of the second inner peripheral surface 42 is larger than that of the first inner peripheral surface 41, the seal ring 38 receives a less resistance from the second inner peripheral surface 42 than from the first inner peripheral surface 41. For this reason, without twisting the gear position sensor 25 around the axis line X, the operator can easily perform the work for inserting the sensor body 34 into the second inner peripheral surface 42. Therefore, the operator can easily perform the work for inserting the sensor body 34 into the insertion hole H while keeping a state in which the angle of the engagement pin 36 of the gear position sensor 25 conforms to the angle of the engaged groove 32 of the drum end portion 28. If the diameter of the second inner peripheral surface 42 is set larger than the outer diameter of the seal ring 38, the operator can easily perform the work for inserting the sensor body 34 into the insertion hole H without a contact between the seal ring 38 and the second inner peripheral surface 42.

When the seal ring 38 passes through the second inner peripheral surface 42 and contacts the third inner peripheral surface 43, a portion of the engagement pin 36 of the gear position sensor 25 is fitted to the entrance portion 32b of the engaged groove 32 of the drum end portion 28. Specifically, in a state in which the seal ring 38 is in contact with the third inner peripheral surface 43, a portion on a tip end side in the axis line X direction, of the engagement pin 36 of the gear position sensor 25, is fitted to the entrance portion 32b of the engaged groove 32 of the drum end portion 28. Actually, immediately before the seal ring 38 contacts the third inner peripheral surface 43, a portion of the engagement pin 36 enters the engaged groove 32.

Since the engaged groove 32 includes the entrance portion 32b with a tapered shape, a clearance in the circumferential direction around the axis line X, which is formed between the engagement pin 36 and the engaged groove 32, is gradually increased as the gear position sensor 25 approaches the entrance of the insertion hole H (moves to an outward side in the vehicle width direction). In other words, as the gear position sensor 25 moves to an inward side in the vehicle width direction within the insertion hole H, the clearance is gradually reduced.

During the work for inserting the gear position sensor 25 into the insertion hole H, a reaction force applied from the third inner peripheral surface 43 to the seal ring 38 has a component in the axis line X direction, in addition to a component in a direction perpendicular to the axis line X direction. For this reason, from a time point when the seal ring 38 has reached the third inner peripheral surface 43, a relatively high insertion resistance begins to be transmitted to the operator. From this, the operator can be aware that the operator may further insert the gear position sensor 25 into the insertion hole H while moving the gear position sensor 25 in clockwise and counterclockwise directions around the axis line X (e.g., while twisting the gear position sensor 25).

Even in a case where the operator performs the work for inserting the gear position sensor 25 into the insertion hole H while slightly moving the gear position sensor 25 in clockwise and counterclockwise directions around the axis line X, the engagement pin 36 is not disengaged from the engaged groove 32, because a portion of the engagement pin 36 is fitted to the entrance portion 32b of the engaged groove 32. The clearance in the circumferential direction around the axis line X, which is formed between the engagement pin 36 of the gear position sensor 25 and the entrance portion 32b of the engaged groove 32, has a tapered shape in which the clearance is gradually increased as the gear position sensor 25 approaches the entrance of the insertion hole H. Therefore, even in a case where the operator pushes the gear position sensor 25 into the insertion hole H in the axis line X direction while slightly moving the gear position sensor 25 in clockwise and counterclockwise directions around the axis line X, the engagement pin 36 is guided to the entrance portion 32b of the engaged groove 32 and led to the constant-width portion 32a of the engaged groove 32.

Finally, in a state in which the seal ring 38 is in tight contact with (pressed against) the first inner peripheral surface 41, the sensor shaft 35 of the gear position sensor 25 is fitted to the constant-diameter portion 31a of the center hole 31 and the engagement pin 36 is fitted to the constant-width portion 32a of the engaged groove 32. In this way, the engagement pin 36 of the gear position sensor 25 is completely fitted to the engaged groove 32 of the drum end portion 28 (see FIG. 3). In this state, the sensor shaft 35 rotates around the axis line X together with the engagement pin 36, according to the rotation of the shift drum 23 around the axis line X. Therefore, the gear position sensor 25 can detect a drum angular position (e.g., any one of first to sixth positions and a neutral position) of the shift drum 23 based on the rotation angle of the sensor shaft 35.

In a case where the motorcycle 1 is parked by use of the side stand 11 (see FIG. 1), the vehicle body is tilted to the left. In this state, the axis line X of the insertion hole H is inclined with respect to a horizontal direction and the entrance side of the insertion hole H (outward side in the vehicle width direction) faces downward. Therefore, even in a case where rain water or the like is accumulated in the clearance formed between the second inner peripheral surface 42 of the insertion hole H and the outer peripheral surface 34a of the gear position sensor 25, the rain water or the like can be naturally discharged.

The present invention is not limited to the above-described embodiment, and the configuration can be changed, added or deleted. For example, although in the above-described embodiment, the engagement part (engagement pin 36) of the gear position sensor 25 has a convex shape and the engaged part (engaged groove 32) of the shift drum 23 has a recessed (depressed) shape, the engagement part of the gear position sensor 25 may have a recessed shape and the engaged part of the shift drum 23 may have a convex shape. The diameter of the second inner peripheral surface 42 may be slightly increased toward the entrance of the insertion hole H (outward side in the vehicle width direction). In that case, the third inner peripheral surface 43 may be omitted, and the second inner peripheral surface 42 and the first inner peripheral surface 41 may be continuous with each other.

Although in the above-described embodiment, the fourth inner peripheral surface 44 is provided between the second inner peripheral surface 42 and the outer surface of the side wall 14a of the crankcase 14, the second inner peripheral surface 42 may be continuous with the outer surface of the side wall 14a of the crankcase 14 without providing the fourth inner peripheral surface 44. Although in the transmission 12 of the above-described embodiment, the dog gear 17b is provided at the output shaft 16, the dog gear 17b may be provided at the input shaft 15. The insertion hole H may be formed in the right side wall of the crankcase 14. The gear position sensor 25 may detect the rotation angle in any way so long as it is a rotation angle meter. For example, the gear position sensor 25 may be a potentiometer or a rotary encoder. The diameter of the second inner peripheral surface 42 may not be constant. In that case, the second inner peripheral surface 42 may have a shape in which its diameter increased toward the outward side in the vehicle width direction so that the second inner peripheral surface 42 can be seen in the vehicle width direction. This is desirable because the seal ring 38 and the gear position sensor 25 can be easily guided to predetermined positions while the seal ring 38 and the gear position sensor 25 are inserted into the insertion hole H.

The invention claimed is:

1. A straddle vehicle comprising:
a shift drum which changes a gear position of a transmission including a plurality of gear trains and is formed with an engaged part in an end surface thereof;
a transmission case which accommodates the shift drum therein, and is formed with a circular insertion hole coaxial with the shift drum, the end surface of the shift drum being accommodated in the insertion hole;
a gear position sensor having a circular outer peripheral surface and including an engagement part engageable with the engaged part of the shift drum in a state in which the gear position sensor is inserted into the insertion hole, the gear position sensor being configured to detect a rotation angle of the shift drum; and
a seal ring fitted to the outer peripheral surface of the gear position sensor,
wherein the insertion hole includes a first inner peripheral surface with which the seal ring is in tight contact in a state in which the engagement part is engaged with the engaged part of the shift drum, and a second inner peripheral surface located closer to an entrance of the insertion hole than the first inner peripheral surface and having a diameter larger than a diameter of the first inner peripheral surface,
wherein in a state in which the seal ring has passed through the second inner peripheral surface and has reached an entrance of the first inner peripheral surface, at least a portion of the engagement part of the gear position sensor is fitted to the engaged part of the shift drum,
wherein the insertion hole further includes a third inner peripheral surface formed between the first inner peripheral surface and the second inner peripheral surface and facing the entrance of the insertion hole, and
wherein the third inner peripheral surface is provided at a location where at least a portion of the engagement part is fitted to an entrance portion of the engaged part in a state in which the seal ring is in contact with the third inner peripheral surface.

2. The straddle vehicle according to claim 1, wherein the third inner peripheral surface is an inclined surface with a diameter reduced in a direction from the second inner peripheral surface toward the first inner peripheral surface.

3. The straddle vehicle according to claim 1, wherein the second inner peripheral surface has an inner diameter which is equal to or larger than an outer diameter of the seal ring.

4. The straddle vehicle according to claim 1, wherein a clearance in a circumferential direction around an axis line which is formed between the engagement part of the gear position sensor and the engaged part of the shift drum is increased as the gear position sensor approaches the entrance of the insertion hole.

5. The straddle vehicle according to claim 1, further comprising:
a vehicle body frame supporting the transmission case; and
a side stand provided so that the vehicle body frame is tilted to a first side in a vehicle width direction during use of the side stand,
wherein the shift drum extends in the vehicle width direction, and
wherein the insertion hole opens outward of the transmission case, on the first side in the vehicle with direction.

6. A straddle vehicle comprising:
a shift drum which changes a gear position of a transmission including a plurality of gear trains and is formed with an engaged part in an end surface thereof;
a transmission case which accommodates the shift drum therein, and is formed with a circular insertion hole coaxial with the shift drum, the end surface of the shift drum being accommodated in the insertion hole;
a gear position sensor having a circular outer peripheral surface and including an engagement part engageable with the engaged part of the shift drum in a state in which the gear position sensor is inserted into the insertion hole, the gear position sensor being configured to detect a rotation angle of the shift drum; and
a seal ring fitted to the outer peripheral surface of the gear position sensor,
wherein the insertion hole includes a first inner peripheral surface with which the seal ring is in tight contact in a state in which the engagement part is engaged with the engaged part of the shift drum, and a second inner peripheral surface located closer to an entrance of the insertion hole than the first inner peripheral surface and having a diameter larger than a diameter of the first inner peripheral surface,
wherein in a state in which the seal ring has passed through the second inner peripheral surface and has reached an entrance of the first inner peripheral surface, at least a portion of the engagement part of the gear position sensor is fitted to the engaged part of the shift drum, and
wherein the second inner peripheral surface has a constant diameter.

7. A straddle vehicle comprising:
a shift drum which changes a gear position of a transmission including a plurality of gear trains and is formed with an engaged part in an end surface thereof;
a transmission case which accommodates the shift drum therein, and is formed with a circular insertion hole coaxial with the shift drum, the end surface of the shift drum being accommodated in the insertion hole;
a gear position sensor having a circular outer peripheral surface and including an engagement part engageable with the engaged part of the shift drum in a state in which the gear position sensor is inserted into the insertion hole, the gear position sensor being configured to detect a rotation angle of the shift drum; and
a seal ring fitted to the outer peripheral surface of the gear position sensor,
wherein the insertion hole includes a first inner peripheral surface with which the seal ring is in tight contact in a state in which the engagement part is engaged with the engaged part of the shift drum, and a second inner peripheral surface located closer to an entrance of the insertion hole than the first inner peripheral surface and having a diameter larger than a diameter of the first inner peripheral surface,
wherein in a state in which the seal ring has passed through the second inner peripheral surface and has reached an entrance of the first inner peripheral surface, at least a portion of the engagement part of the gear position sensor is fitted to the engaged part of the shift drum, and
wherein a first distance from an end edge of the seal ring on an inner side in a vehicle width direction, to an end edge of the engagement part on the inner side in the vehicle width direction, is longer than a second distance from the end surface of the shift drum on an outer side in the vehicle width direction to an end edge of the first inner peripheral surface on the outer side in the vehicle width direction.

8. The straddle vehicle according to claim 7, wherein the first distance is shorter than a third distance from the end surface of the shift drum on the outer side in the vehicle width direction to an end edge of the second inner peripheral surface on the inner side in the vehicle width direction.

* * * * *